US00RE35518E

United States Patent [19]

Sussina

[11] E Patent Number: Re. 35,518

[45] Reissued Date of Patent: May 27, 1997

[54] RESTRICTED KEY SYSTEM

[75] Inventor: Stan J. Sussina, Dumfries, Va.

[73] Assignee: Medeco Security Locks, Inc., Salem, Va.

[21] Appl. No.: 368,639

[22] Filed: Jan. 4, 1995

Related U.S. Patent Documents

Reissue of:

[64] Patent No.: 5,176,015
Issued: Jan. 5, 1993
Appl. No.: 683,151
Filed: Apr. 10, 1991

[51] Int. Cl.[6] ..... E05B 9/04

[52] U.S. Cl. ..... 70/369; 70/407; 70/340; 70/421; 70/409

[58] Field of Search ..... 70/357, 358, 490–493, 70/367, 369, 371, 375, 419–421, 393, 402, 405, 407, 409, 411, 382–385, 340, 342, 366, 453–54

[56] References Cited

U.S. PATENT DOCUMENTS

| | | | |
|---|---|---|---|
| 234,630 | 11/1880 | Towne | 70/375 |
| 540,111 | 11/1895 | Sargent | 70/340 |
| 588,026 | 8/1897 | Stadtmuller | 70/340 |
| 898,767 | 9/1908 | Mercer . | |
| 1,915,897 | 6/1933 | Maxwell et al. | 70/407 |
| 2,049,548 | 8/1936 | Swanson | 70/47 |
| 2,318,887 | 5/1943 | Ramsell et al. . | |
| 2,426,104 | 8/1947 | Johnstone . | |
| 2,814,941 | 12/1957 | Best | 70/340 |
| 3,603,123 | 9/1971 | Best | 70/369 |
| 3,797,292 | 3/1974 | Taylor | 70/409 |
| 4,099,398 | 7/1978 | Lipschutz | 70/408 |
| 4,213,316 | 7/1980 | Tietz | 70/421 |
| 4,282,731 | 8/1981 | Taksony . | |
| 4,294,093 | 10/1981 | Best et al. | 70/369 |
| 4,356,713 | 11/1982 | Widen | 70/419 |
| 4,407,147 | 10/1983 | Larson . | |
| 4,416,128 | 11/1983 | Steinbrink | 70/364 |
| 4,444,034 | 4/1984 | Best et al. | 70/371 |
| 4,578,969 | 4/1986 | Larson . | |
| 4,683,740 | 8/1987 | Errani | 70/419 |
| 4,787,225 | 11/1988 | Häuser et al. | 70/407 |
| 4,805,428 | 2/1989 | Krun . | |
| 4,815,307 | 3/1989 | Widen | 70/407 |
| 5,092,147 | 3/1992 | Mochida et al. . | |
| 5,124,116 | 6/1992 | Whitt . | |

FOREIGN PATENT DOCUMENTS

| | | | |
|---|---|---|---|
| 166945 | 1/1986 | European Pat. Off. . | |
| 2546551 | 4/1977 | Germany . | |
| 3609081 | 9/1987 | Germany | 70/493 |
| 22782 | of 1901 | United Kingdom | 70/409 X |
| 2516340 | 11/1975 | United Kingdom | 70/407 |

*Primary Examiner*—Darnell M. Boucher
*Attorney, Agent, or Firm*—Rothwell, Figg, Ernst & Kurz

[57] ABSTRACT

A restricted key system providing keys/key slots with an angled or chevron shaped cross sectional profile. Each key blade of the restricted key system includes an upper planar portion which is bitted or cut to position the standard pin tumblers, an intermediate portion which forms a horizontal ledge, and a lower planar portion which extends from the intermediate portion at an angle in the range of 5°–85° relative to the upper planar portion. The horizontal ledge of the key blade may be provided with at least two additional bitting surfaces for wards, tumblers and/or other key differing elements.

16 Claims, 4 Drawing Sheets

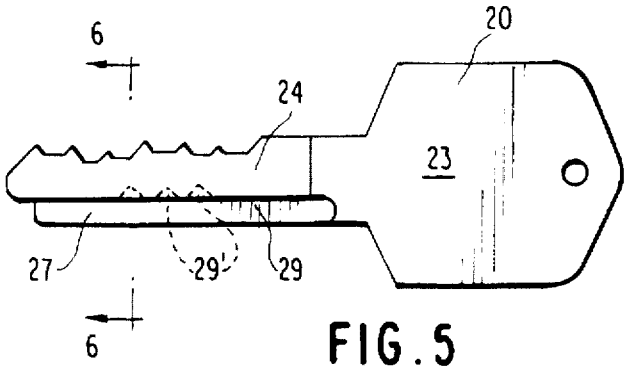
FIG. 5
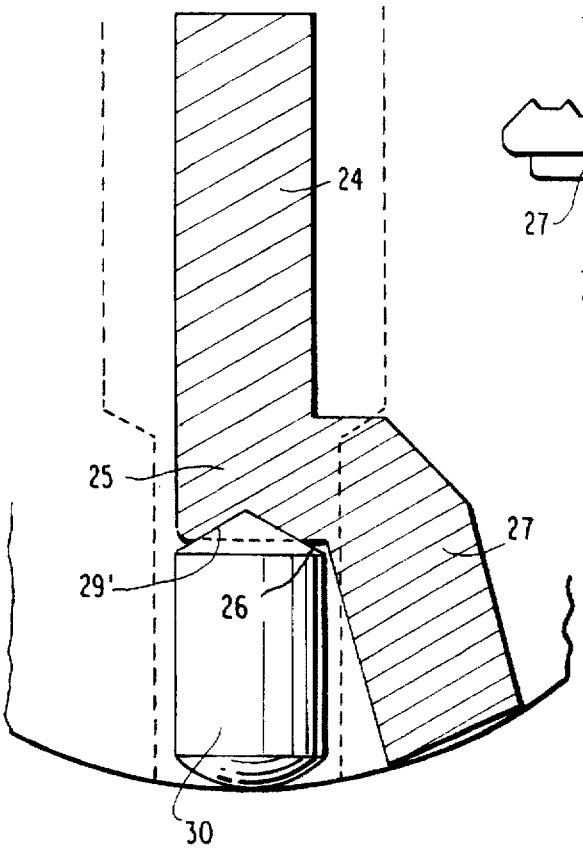
FIG. 6
FIG. 6A
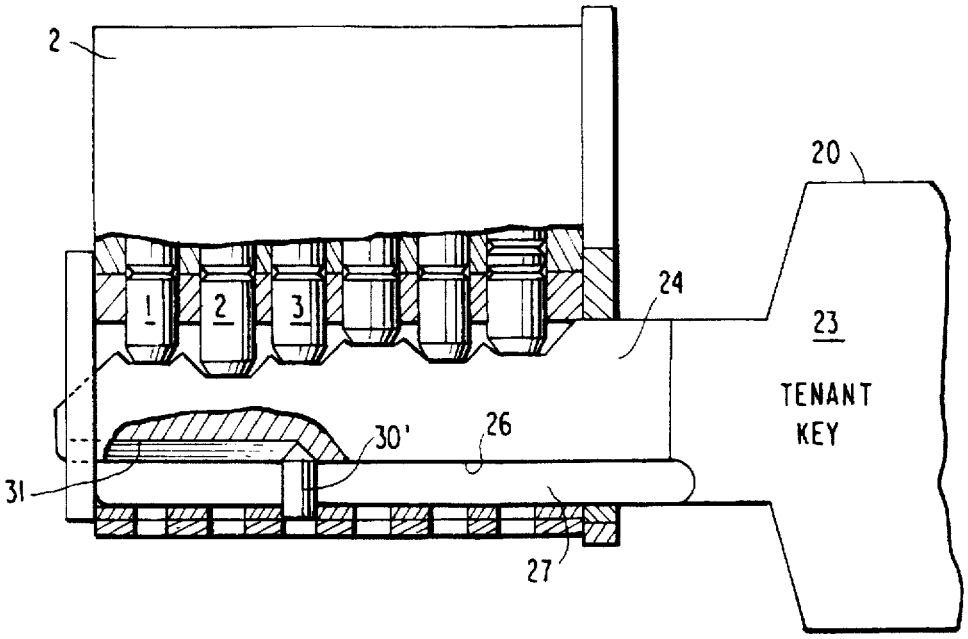

FIG. 7
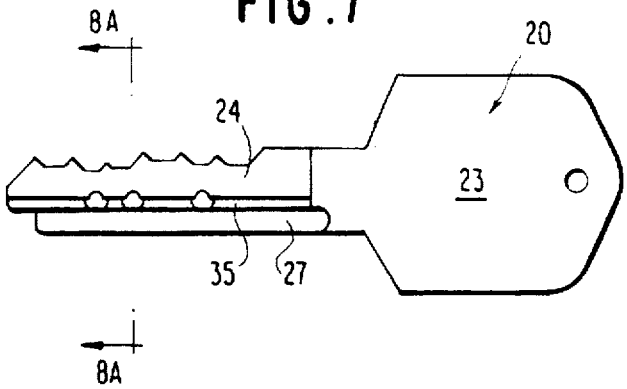
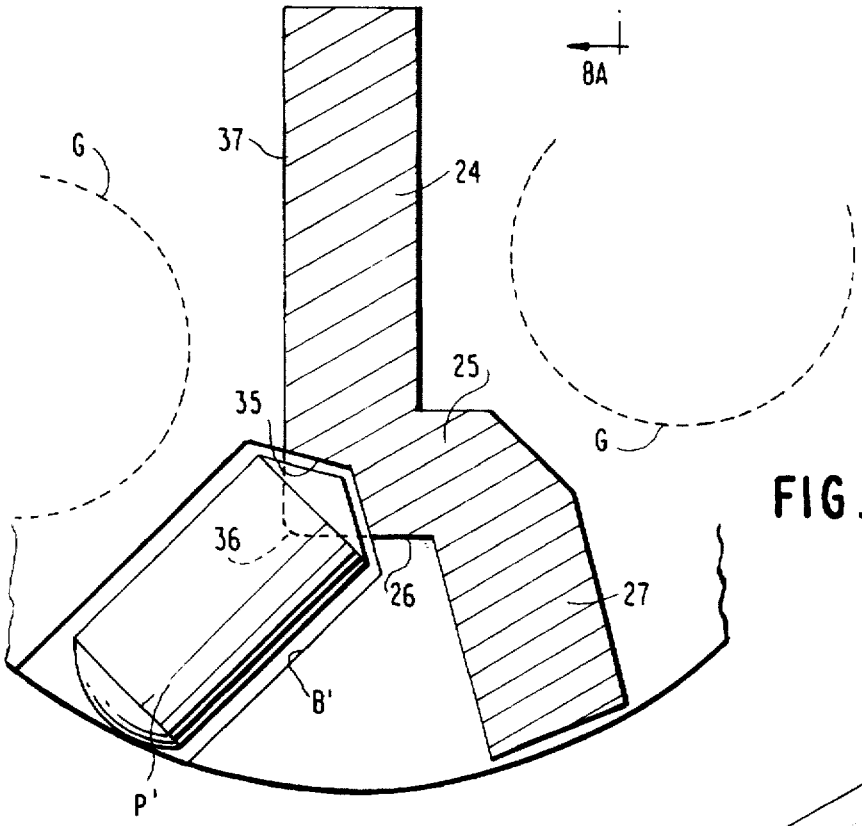
FIG. 8
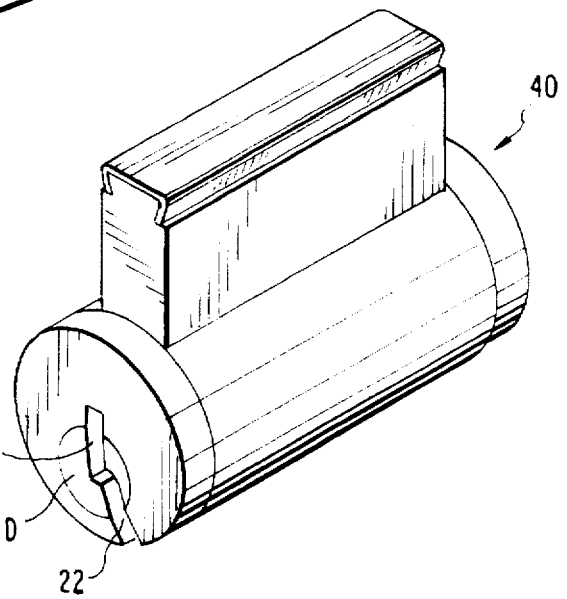
FIG. 9

RESTRICTED KEY SYSTEM

Matter enclosed in heavy brackets [ ] appears in the original patent but forms no part of this reissue specification; matter printed in italics indicates the additions made by reissue.

BACKGROUND OF THE INVENTION

My invention relates to improvements in keys and key barrels for conventional lock cylinders and cylinders which have key-removable cores. Such well known mechanisms use pin tumblers which are evenly spaced in a single row along the length of the key barrel. In particularly, my invention relates to keys having new cross-sectional profiles and the corresponding key barrels suitable for such keys.

In general, my invention relates to conventional key cylinders and cylinders which use key-removable cores of the type described in U.S. Pat. No. 2,814,941 (Best), U.S. Pat. No. 3,603,123 (Best), and in G. L. Finch's Service Manual entitled "Servicing Interchangeable Cores," revised in 1988.

The above-noted key-removable, interchangeable cores have been in widespread use in the United States for more than 20 years. Such interchangeable cores permit unskilled persons to rekey locks (i.e., block-out existing keys) in 10 to 15 seconds without opening the door or removing the cylinder body. To achieve the convenience of interchangeable cores, all interchangeable cores in a given system are pinned for release from their housings by a single "control key." The control key is actually a "top" master key whose sole function is limited (15 degree rotation) to operation of the blocking lug which retains the core in the cylinder body. Control keys are not visually distinguishable from other keys in the system. Typically, the core is also pinned to one or more master keys and to a tenant key. Such a system usually requires three or four pin segments in each pin column, an arrangement which offers very limited pick-resistance.

In large institutions such as colleges, hospitals, etc., door lock security is threatened by the circulation of unauthorized keys. In relative terms, lock-picking is a minor consideration. While a building manager's ability to instantly rekey with interchangeable cores clearly promises a degree of key control, a serious problem exists in universities, for instance, where students can have unauthorized copies of their keys made at a hardware store or lockshop. The most practical protection against this security compromise resides in proprietary keys (patented) which only can be made and duplicated by the lock maker or an authorized locksmith, (a) because key blank distribution is restricted by the manufacturer, (b) because the key blank cannot be bitted (finished) on machines in current use by keymakers and locksmiths. An additional level of protection exists if prior art key blanks cannot easily be modified or counterfeited to enter proprietary key slots and, when proprietary key blanks cannot be bitted in a single operation on a single machine. Further, although not generally known, master keying technology, similar to that employed in generic interchangeable cores, may reduce the number of usable change keys in a single system to between 2 and 5% of those available in non-master keyed cylinders. Such a limited number of key changes may not be enough to guarantee trustworthy locks in a medium-sized institution. Accordingly, when too few key changes are available, there is no certainty that a key to one lock will not inadvertently operate other locks on the premises.

Key removable, interchangeable cores are manufactured by most American lockmakers. Core interchangeability is usually limited to the housings of a single manufacturer (i.e., SARGENT cores in SARGENT housings, YALE cores in YALE housings, etc.). However, the interchangeable cores referenced in the above-noted Finch's Service Manual are generic in the sense that a BEST core fits (i.e., interchanges with) the housings of ARROW, FALCON, EAGLE and others. Likewise, the cores of ARROW, FALCON, EAGLE and others fit the BEST housings, etc. without onsite modification.

Further exacerbating key control problems is the fact that the above-mentioned generic cores all use common, warded key slots which are suited to flat keys which are grooved on both sides. 100,000 groove patterns are in the public domain. Some milling differs are so minute when compared with each other, that they cannot perform their security function as intended, particularly when the key slots are worn or were not broached to close tolerances.

Typical keys for generic cores are milled on two flat surfaces. The key slot warding reflects the milling pattern of the lowest level keys (i.e., the keys assigned to tenants). Master keys are thinner sections which are side milled to enter (pass) selected groups of key slots. The top master key and the control key must enter all key slots in a given system, which may number in the thousands.

Typical hierarchical order of keys/sections:

CONTROL KEY will change all cores in a system.

GRAND MASTER KEY will unlock any lock in the system.

MASTER & SUBMASTER KEYS unlock only specific groups of locks.

TENANT KEYS unlock one lock only. In large systems tenant keys are bitted on several related (family) key sections under each master key.

Control and Grandmaster Keys may be bitted on the same key blank section. Master key blank sections (because they must pass two or more key slots that differ) are usually thinner sections.

However, in practice, problems arise in such systems since blank manufacturers do not restrict the distribution of key blanks used to bit or cut the keys for the generic cores. Further, hardware stores and some keymakers only stock master key blank sections, which of course will enter all cores in a group. Some will enter all cores in the system. Some will enter cores in every generic core system.

Thus, there are tens of millions of generic interchangeable cores on doors throughout America. Statistically, even the lowest level keys (i.e., tenant keys) can be expected to unintentionally operate thousands of interchangeable cores in systems other than their own.

In addition, since biting combinations for master keys are randomly selected, a tenant key from almost any generic core system, when copied on a control key blank section, has the potential of operating cores, or removing cores from their housings in other systems across the street or across the country.

U.S. Pat. No. 2,049,548 (Swanson) discloses a guard tumbler which is comprised of two members which are biased toward the key slot by a compression spring. The guard is similar in construction to that of conventional pin tumblers except that it is longer than the other tumblers and its operating chamber extends to the bottom of the key slot, as shown in FIG. 1. In order to effect release of the key barrel, a key having a notched lip and a supporting wing is employed. The lip is provided with the usual notches (bittings) for positioning the tumblers and a guard releasing notch is formed in the inner end of the lip, between the lip and the key bow. Because of the employment of a guard releasing notch, the supporting wing is included to obtain sufficient strength in the key. FIGS. 10 and 11 of Swanson show variations on the form of the angularly shaped key slot for receiving a like shaped key blade. Thus, the portion of the key blade which corresponds to the lower portion of the key slot in FIG. 10 and which corresponds to the horizontal portion of the key slot in FIG. 11 serve the same purpose as the supporting wing of the first embodiment.

However, FIGS. 10 and 11 both show angular keys (dotted lines and see claim 7) which are notched forward of the bow for the guard tumbler. This leaves only 4 tumbler positions on the key which can be bitted differently. 10 bitting increments to the 4th power can yield a maximum of 10,000 theoretical key changes; not near enough for contemporary requirements.

The key in FIG. 10 has parallel legs of the same width. This permits key duplication on conventional bitting machines. The skewed key slot, however, precludes placing secondary wards or tumblers directly beneath the horizontal leg of the key in line with the primary tumblers.

The key in FIG. 11 has right angle legs of the same width. The key cannot lay flat, an important consideration for consumer acceptance in the 1990's.

U.S. Pat. No. 4,683,740 (Errani) is similar to Swanson. In particular, upon inserting a picking tool (see FIG. 3) in an attempt to bring the pins to shear at the key barrel periphery, one or more pins are unavoidably extended into the cylinder body, thus inhibiting key barrel rotation.

However, the Errani key's horizontal portion separating a bitting portion from a support portion is uniquely undercut to compliment a restricted-access key slot. The secondary key differing elements are bitted on both sides of the support portion. All blade portions relative to the key bow are on a single plane. The restricted access key slot requires a key with a much wider support portion than usual which greatly limits the number of key changes that can be generated by the remaining relatively shallow bitting portion which positions the primary tumblers. Errani's horizontal portion cannot be bitted on its underside.

U.S. Pat. No. 4,416,128 (Steinbrink) relates to an arcuate skeleton in a flat key to resist the effectiveness of a pick-gun.

U.S. Pat. No. 2,814,941 (Best), U.S. Pat. No. 3,603,123 (Best) and U.S. Pat. No. 4,294,093 (Best) each relate to key-removable lock cores employing the standard key slot.

SUMMARY OF THE INVENTION

It is an object of the present invention to correct the above-mentioned problems/deficiencies by providing keys/key slots with new cross sectional profiles which, for instance, are readily produced from flat metal stampings.

It is a further object of the present invention to create a proprietary restricted key system capable of generating an extraordinary number of change key combinations which were heretofore unavailable.

It is a further object of the present invention to create a series/family of proprietary key slots which block entry to all prior art keys.

It is a still further object to create a series/family of proprietary key sections which cannot be bitted (i.e., cut) on machines currently used by locksmiths and commercial key copiers.

It is yet another object of the present invention to create proprietary key sections and corresponding key slots for interchangeable cores which can also be used in conventional key cylinders.

It is a further object to make these improvements without materially altering the well-known construction of conventional key cylinders and generic key-removable cores.

To enhance the pick-resistance of key cylinders by restricting free access to the pin columns and torquing means.

To enhance the security of key cylinders by making it impractical to counterfeit keys.

To enhance key control by making it impractical to make unauthorized copies of keys.

To enhance drill-resistance by placing carbide pins directly under selected pin columns.

These objects are achieved by the present restricted key system which is intended to operate proprietary cores in state of the art generic core housings. Central to the present restricted key system are a family of angled key sections which lend themselves to the usual warding techniques, new key section differing methods and new secondary bittings.

The restricted key system provides key/key slots with an angled or chevron shaped cross sectional profile. Each key blade of the restricted key system includes an upper planar portion which is bitted or cut to position the standard pin tumblers, an intermediate portion which forms a horizontal ledge, and a lower planar portion which extends from the intermediate portion at an angle in the range of 5°–85° relative to the upper planar portion. The horizontal ledge of the key blade may be provided with at least two additional bitting surfaces for wards, tumblers and/or other key differing elements.

BRIEF DESCRIPTION OF THE DRAWINGS

Other features and advantages of the present invention will be apparent from the following description taken in connection with the accompanying drawings wherein:

FIG. 5 is a side view of the key according to a second embodiment wherein a secondary bitting surface is provided under a horizontal ledge portion;

FIG. 6 is an enlarged cross sectional view of the key blade of FIG. 5 taken along the lines [6A—6A] *6—6*, with a secondary ward pin or tumbler being shown;

FIG. 6A is a partial cross sectional view showing a carbide warding pin engaging a groove in the key blade;

FIG. 7 is a side view of the key according to a third embodiment wherein a secondary bitting surface is provided along a corner of the horizontal portion of the key blade;

FIG. 8 is an enlarged cross sectional view of the key blade of FIG. 7 taken along the lines 8A—8A, with a secondary ward pin or tumbler being shown; and FIG. 9 is a perspective view of a standard key cylinder utilizing the inventive key slot and key.

DETAILED DESCRIPTION OF THE PREFERRED EMBODIMENTS

Figure 1:
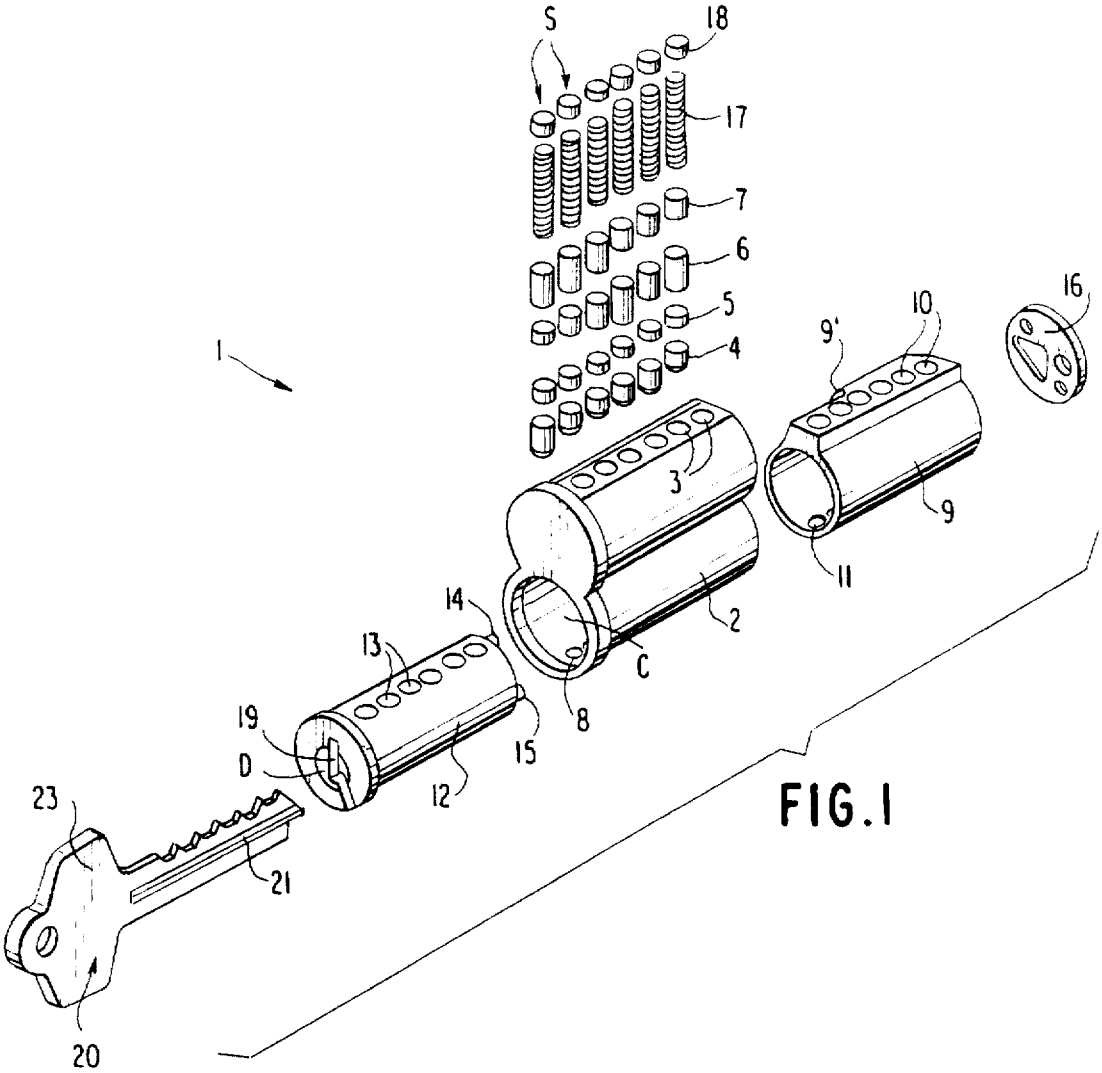
FIG. 1 is an exploded view of a key operated, interchangeable core subassembly according to the present invention.

The invention will now be described with reference to the drawings. As shown in FIG. 1, a key operated, interchangeable core subassembly 1 of the present restricted key system is shown exploded for ease of description. The core subassembly 1 is fitted into a like-shaped opening in a cylinder body or housing (not shown) which remains in the door or the like. The core subassembly 1 includes an outer shell 2 having a figure-8 shaped cross section. The outer shell 2 has a plurality of vertical bores or pin chambers 3 for receiving pin stacks S (described later). At the lower portion of the outer shell 2, core service holes 8, through which a tool is introduced to forcibly remove tumblers from the core subassembly prior to rekeying, are disposed.

A sleeve 9 having a blocking or locking lug 9' formed thereon is fitted within a cylindrical bore C formed in the lower portion of the outer shell 2 from the rear. The sleeve 9 has upper bores 10 which correspond to the bores 3 of the outer shell 2. The lower holes 11 are service holes which correspond to holes 8.

A rotatable key barrel 12 is inserted at the front of the outer shell 2 and is fitted within the sleeve 9. The key barrel 12 includes a plurality of bores 13 on a radial plane and which correspond to the bores 10 of the sleeve 9 and the bores 3 of the outer shell 2. The bores 13 extend into the key barrel 12. The key barrel 12 has a key slot 19 which extends longitudinally in the key barrel for receiving a key and intersecting the bores 13. A dimple D is drilled in the key barrel face to facilitate smooth key entry. The key barrel 12 also includes a pair of posts 14 and 15 to which a key stop disc 16 is mounted. The key stop also retains the key barrel in the subassembly.

The pin stacks include bottom pins 4 which are radially adjusted within the bores 13 by corresponding bittings cut in the top edge of the key. Above the bottom pins 4 lie the master pins 5. The master pins create a second shear line for a master key. Next, the control pins 6 are disposed above the master pins 5. The control pins 6 create a control shear line for a control key. Finally, the top pins 7, called drivers, are the uppermost pins in the pin stacks. Cylinder springs 17 rest on top of the pin stacks and apply a downward compression force to the stacks. Cylinder caps 18 are used to close the chambers of the core.

Therefore, the initial function of a control key is to align the divisions between the top pins 7 and the control pins 6 at the outer periphery of the control sleeve 9, and position one or more pin segments to block independent rotation of the key barrel 12. The control sleeve 9 and the key barrel 12 rotate in unison. Turning the control key clockwise 15 degrees or so retracts the blocking lug 9', permitting withdrawal of the core subassembly 1.

The control key cannot be withdrawn from the core unless the blocking lug 9' is in the extended (blocking) position.

Inserting a new core 1 requires retracting the blocking lug 9' with a control key, inserting the core subassembly in the figure-eight housing, and turning the control key (key barrel/control sleeve) counterclockwise. Removal of the control key confirms that the operation is complete. The expired time is 15 to 20 seconds for this operation.

Similarly, the initial function of master and tenant keys is to align the divisions between selected pin segments to coincide at the key barrel periphery. The key barrel 12 interfaces with connecting elements (not shown) which extend or withdraw a lock bolt (not shown) as the key turns.

In generic key interchangeable cores, two longitudinal blind cavities bored parallel to the key slot from the back end of the key barrel engage corresponding prongs (not shown) which are rotatably disposed in the core housing to operate the bolt mechanism as the key turns.

The cutout on the bottom of the key tip has long been associated with interchangeable cores. Stopping key entry at the tip instead of at the bow shoulder permits a single key blank to be used for 5, 6, or 7 pin mechanisms. The dimensional obstacles imposed by the key stop plate connecting means (posts) and the prong cavity locations have discouraged key section design variations except for the usual milling/warding techniques.

The detailed description so far of the interchangeable core subassembly 1 is well known to those skilled in the art. A further disclosure of the operation of a pin tumbler type lock can be found in U.S. Pat. No. 3,603,123 (Best), which disclosure is incorporated herein by reference.

Figure 2:
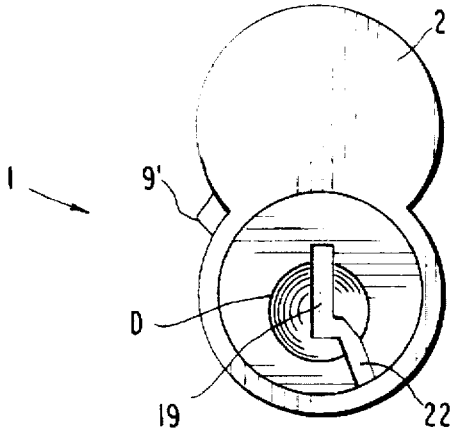
FIG. 2 is a front end view of the core subassembly showing the key slot according to the present invention.

As shown in FIGS. 1 and 2, the key slot 19 (and key blade 21 of the key 20) of the present restricted key system have an angled key section 22 which allows for the usual side milling/warding techniques, new key section differing methods and new secondary bittings. While both the key blade 21 and the key slot 19 have the inventive angled shape, the key 20 will now be described in detail.

Figure 3:
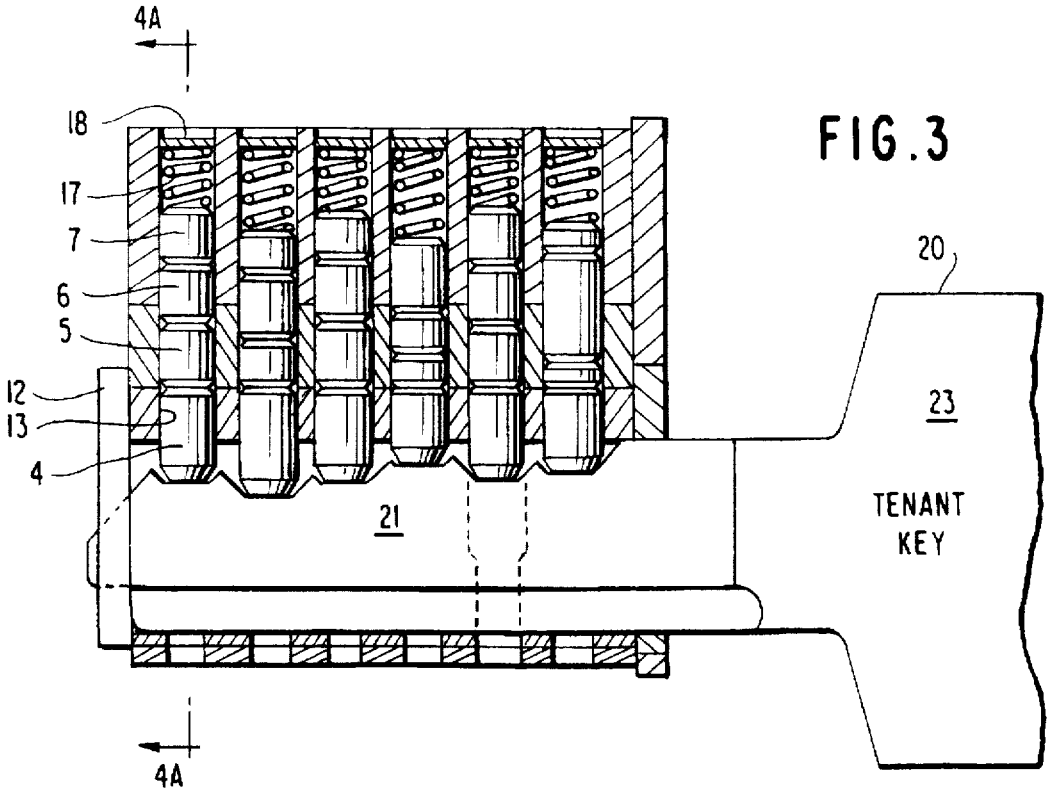
FIG. 3 illustrates key bitting details and shows lower limits of pin chambers where they intersect with smaller diameter core service holes.

In general, the key 20 includes a bow member 23 which is adapted to be grasped by the fingers of a user, and a key blade 21 which enters the key slot 19. The key blade is functionally divided horizontally. The upper portion of the key is cut or bitted to position primary tumblers of varying lengths (see FIG. 3). The intermediate and lower portions support the upper bitting portion and have secondary functions of their own.

Figure 4:
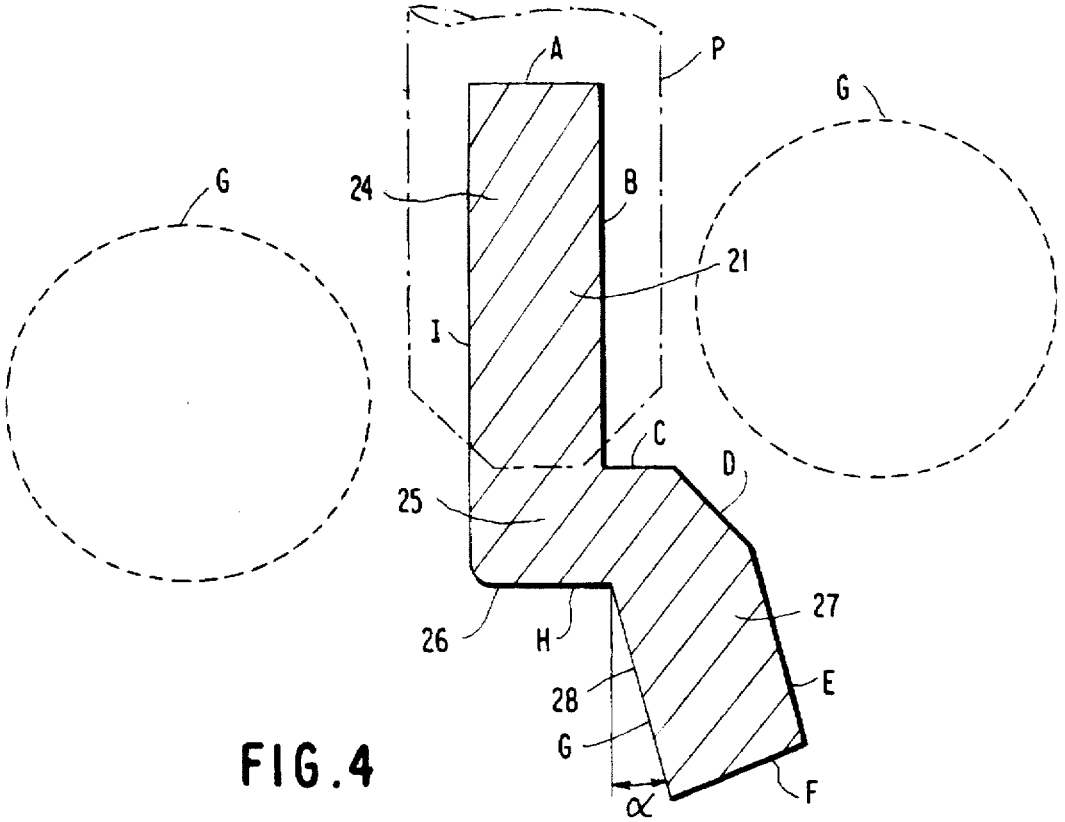
FIG. 4 is an enlarged cross sectional view of the key blade according to the present invention taken along the lines, 4A—4A in FIG. 3.

As best seen in FIG. 4, each key blade 21 of the present restricted key system has an angled or chevron shaped cross section. The upper vertical, planar portion 24 is bitted to position the standard pin tumblers P, one of which is shown in phantom lines. Of course, there is a plurality of pin stacks as shown in FIG. 1.

An intermediate portion 25 forms a horizontal ledge 26. As will be discussed in more detail below, the horizontal ledge 26 serves two primary functions. First, it provides reference and support in key making operations, and second, it provides at least two additional, (optional) bitting surfaces for wards, tumblers and/or other key differing elements.

A lower planar portion 27 extends at a predetermined angle $\alpha$ from the intermediate portion 25. The angle $\alpha$ can be set in the range of approximately 5°–85° with respect to a vertical line extending downward from the point where the horizontal ledge 26 meets the inner face 28 of the lower planar portion 27.

The practical range of angles for key sections is limited by the fixed location of prong cavities G (see FIGS. 4 and 8) and the mounting posts for the key stop. It is the common location of the prong cavities, their length and diameter which permit all cores in the generic group to be interchangeable. The cavity locations may be the primary reason that BEST and others have focused on proprietary pinning systems to generate additional key changes. Best (U.S. Pat. No. 3,603,123) Table 1, relies on base 7 bitting increments to increase the usable key combinations in 6 tumbler cores, from the traditional 4,096 changes to 46,656. This is achieved by reducing incremental bitting depths from 0.025" to 0.018". The 0.007" trade-off for additional key changes lessens the cylinder's resistance to key jiggling and interchange.

The present invention generates an extraordinary number of theoretical key changes by using two additional key bitting surfaces. The elements positioned by the new bittings inherently resist key jiggling techniques as well as inadvertent key interchange; both serious problems associated with generic key-removable cores.

A key with an angle α of 15° for instance, can be readily and economically machined from sheet metal stampings with a minimum of material waste (scrap).

The angled key blade cross section of the present invention presents innumerable new key blank differing possibilities that cannot be generated by the usual milling/warding techniques. In particular, the restricted key system cross section provides nine profile surfaces A through I compared with four surfaces in prior art keys. At least five of the nine profile surfaces lend themselves to two differing techniques. In particular, surfaces B, D, E, G and I are variable. The first differing technique is that each of the surfaces B, D, E, G and I can be milled to pass a corresponding ward in the key slot 19. This creates two differs (i.e., milled or unmilled). The second differing technique is that the five surfaces B, D, E, G and I can be made slightly thicker, or independently shifted up, down, right or left of a common center or default position to create two additional differs (shifted/unshifted). Thus, four variable applied to five surfaces yield 1024 discrete key blank sections for each incremental blade angle variation. Note, this number may be doubled for conventional lock cylinders (without interchangeable cores) or interchangeable cores which use a different key stop method, that can use mirror image key sections extending into the opposite, or left side of the key barrel.

More importantly, the angled change keys/blanks of the present restricted key system will enter no key slot but their own. Likewise, the series/family of proprietary key slots will block entry to all prior art keys.

The key blanks/sections of the present invention can be drawn, cast or stamped from sheet metal and customized by well-known mass production techniques. The key blank thickness and profile of the present invention cannot be readily procured through normal distribution channels. The specific widths of the stamping required to produce angled key blanks with a varying angle α are as follows:

| Angle α | Unmilled Key Blank Thickness |
|---|---|
| 15° | .120" |
| 25° | .136" |
| 30° | .139" |
| 45° | .150" |

The chart illustrates a limited selection of angled key sections to show some practical variations, but those skilled in the art will recognize that variations of 5 degrees are sufficient to prevent keys of any standardized angle from entering key slots formed at another standardized angle.

The key blade 21 and key bow 23 can be stamped and machined in one piece. The bow 23 can be in alignment with the upper planar portion 24 of the key blade 21 having the standard bitting thereon or aligned with the lower planar portion 27 of the key blade 21. Alternatively, the key blade 21 can be stamped and machined without a bow. A separate handle piece can then be affixed substantially in line with the upper planar portion 24 of the key blade 21 or in line with the lower planar portion 27 of the key blade 21.

As noted above, the horizontal ledge 26 of the key blade 21 provides at least two additional, optional bitting surfaces. The embodiment of FIGS. 5 and 6 illustrates a bitting surface 29 provided directly under and along the horizontal ledge 26 of the key blade 21 (note, like reference numerals are used to denote like elements). The bitting surface 29 is in addition to the normal bitting surface disposed along the upper portion 24. Binary tumbler bittings under the horizontal ledge are dimples 29' which are approximately 0.020" deep. Logically, drilled dimples would not appear in all bitting positions.

A secondary tumbler 30 illustrated in FIG. 6 operates in the service holes. The binary tumbler tip portion which engages the bitting is pointed to match the shape of the dimple 29'. It's other ends is rounded to seat in the service hole in the blocking lug sleeve. If the key has properly positioned the primary tumblers, attempts to rotate the key barrel 12 will cam the binary tumblers towards the horizontal ledge 26 in the key. If the key is unbitted where a bitting is required, the rounded end of the tumbler cannot disengage from the non-rotatable sleeve, preventing key barrel rotation.

As shown in FIG. 6A, when the underside of the horizontal ledge 26 is optionally used to restrict key entry, a carbide warding pin 30' is placed in a specific service hole to block entry of keys which are not grooved from key tip to the pin position. For example, one group of tenant keys would be grooved to pass a ward pin in the No. 3 position, for instance. Tenant keys in another group would be grooved to pass a ward pin in the 4th position, etc. The top master key and control key would be grooved the length of the key blade to pass all ward pins.

The depth of the groove 31 and the depth of any individual secondary bittings would be approximately 0.015–0.020". When only some pin positions are warded for key blocking purposes, portions of the blade not grooved can optionally be bitted for secondary tumblers.

In a third embodiment, as shown in FIGS. 7 and 8, a still further bitting surface 35 may be provided in addition to or in lieu of the additional bitting surface 29, as shown in FIG. 6. The bitting surface 35 is provided along a corner portion 36 formed where the horizontal ledge 26 meets an outer surface 37 of the upper planar portion 24 of the key blade 21. As shown in FIG. 8, a second set of spring/tumbler cavities can optionally be bored to the left of the key slot 19. Note, a single pin P' and bore B' are visible in FIG. 8. If six secondary tumblers with binary differs are disposed along the corner of the horizontal ledge 26, this would multiply the present theoretical key change potential from 1,000,000 (primary tumblers) to 64,000,000 changes per discrete key blank section.

In common pin tumbler cylinders, and cylinders with key removable generic cores, the tumblers are evenly spaced in a single row along the length of the key barrel. Key differing is a theoretical process which divides the bitting portion of the key blade horizontally into standard depth increments.

A key bitting blade which is 0.150" wide, can for instance, generate ten bitting depth increments of 0.015" each. In a 6 tumbler system, 1,000,000 theoretical keys can be made which differ from each other by a minimum depth variation of 0.015" in at least one bitting position. Such increments are too minute to be reliable mechanically. Double increments of 0.030" are widely accepted as being more practical.

5 incremental differs of 0.030" each offer more realistic protection against key interchange. In the same system, they will yield only 15,625 theoretical key bitting combinations.

The 15,625 theoretical key differs above are reduced to a maximum of 4,096 change key bitting combinations when a 0.030" pin segment is placed between top and bottom pins in each pin column for masterkeying.

The present invention increases the theoretical key change potential of generic pin tumbler mechanisms from 1,000,000 to 4,096,000,000 bitting combinations per discrete key section, as follows:

1,000,000 theoretical changes attributed to six primary tumblers above.

| | |
|---|---|
| 64 | theoretical changes attributed to six binary secondary bittings under the horizontal ledge. 2 to the 6th power. |
| 64 | theoretical changes attributed to six binary secondary bittings on the corner of the horizontal ledge. 2 to the 6th power. |
| 64 × 64 = 4,096 × 1,000,000 = 4,096,000. | |
| 1,024 | Discrete key sections based on shifted/unshifted and milled/unmilled options. |
| 9 | Key section angle options in the range of 5 to 45 degrees. |
| 1,024 × 9 = 9,216 | Proprietary key blank sections. |
| 17 | Key section angle options in the range of 5 to 85 degrees. |
| 1,024 × 17 = 17,408 | Proprietary key blank sections. |
| 4,096,000,000 | Theoretical key changes for each of |
| 17,408 | Proprietary key blank sections. |

Since the key blanks of the present restricted key system do not resemble the prior art keys, the key blanks will not fit conventional key machines. In particular, an attempt to duplicate a restricted key system key would disclose (a) the lower angled leg of the key blank, if one were available, cannot be independently supported by key machine vises in current use; (b) even if the blank is supported at the bow, the conventional cutter would produce primary bittings which are high on one side and would have to be finished by hand. In addition, the secondary bittings and/or grooves require two additional machine set ups and this, in turn, makes key counterfeiting more complicated and impractical.

The present restricted key system is equally applicable to a standard key cylinder 40 (see FIG. 9) wherein the core is not key removable. Of course, it would be necessary to bore holes for the carbide pins, etc. to be conveniently disposed longitudinally under the horizontal ledge 26 since there are no existing service holes as in the removable core type cylinder.

With the above-described restricted key system, the following advantages are realized:

SECURE KEY CHANGES: Additional bitting increments permit the factory to discard well known key bitting combinations that are likely to operate more locks in a given system than intended.

INCREASED PICK RESISTANCE: In particular, in prior art cores a comb-like picking tool inserted in the keyslot can engage and apply the necessary torque to the blocking lug sleeve. In the present invention, the angled, offset key slot blocks direct access to the service holes. In addition, new, safe bitting combinations permit the factory to disregard bitting combinations that are relatively easy to pick.

INCREASED DRILL-RESISTANCE: Carbide pins are inserted in one or more core service holes to stop or misdirect drill bits.

ENHANCED KEY CONTROL: Proprietary key and key blank distribution is controlled at the factory. An extraordinary number of unique key sections and key bitting combinations greatly reduces the probability of any key operating the wrong lock. Two dissimilar key bitting techniques and the unavailability of machines for the duplication of the present restricted key system restores building management control over unauthorized key duplication.

It is contemplated that numerous modifications may be made to the restricted key system of the present invention without departing from the spirit and scope of the invention as defined in the following claims.

What is claimed is:

1. A key blank comprising:

a) a bow member adapted to be grasped by fingers of a user, and b) an elongate blade extending outwardly from the bow member and defining, in transverse cross section, an upper planar blade portion extending inwardly from one longitudinal edge of the blade, and a lower planar blade portion extending inwardly from another, opposite longitudinal edge of the blade and adjoining an innermost edge of the upper blade portion in an intermediate *ledge* portion of the blade, c) wherein:

the plane of the upper blade portion is oriented at a predetermined angle, in a range of 5° to 85° relative to the plane of the lower blade portion to define a general chevron shape therewith.

2. The key blank according to claim 1, wherein said upper planar portion includes a bitting surface along said one longitudinally edge of said blade.

3. The key blank according to claim 1, wherein said intermediate *ledge* portion includes a horizontal ledge, said horizontal ledge having a bitting surface disposed directly under and along said horizontal ledge of said blade.

4. The key blank according to claim 2, wherein said intermediate *ledge* portion includes a horizontal ledge; and further comprising an additional bitting surface disposed directly under and along said horizontal ledge of said blade.

5. The key blank according to claim 1, wherein said intermediate *ledge* portion includes a horizontal ledge, said horizontal ledge meeting an outer surface of said upper planar portion at a corner portion; and further comprising a bitting surface disposed along said corner portion.

6. The key blank according to claim 2, wherein said intermediate *ledge* portion includes a horizontal ledge, said horizontal ledge meeting an outer surface of said upper planar portion at a corner portion; and further comprising an additional bitting surface disposed along said corner portion.

7. The key blank according to claim 1, wherein said predetermined angle is in a range of 15° to 45°.

8. A cylinder lock comprising:

a lock cylinder having a cylindrical bore formed therein;

a key barrel rotatably mounted within said cylindrical bore;

a first set of bores formed in said key barrel on a radial plane;

a plurality of pins slidably disposed in said first set of bores;

a key slot extending longitudinally in said key barrel for receiving a key and intersecting said first set of bores;

a second set of bores formed in said lock cylinder; and a plurality of tumbler pins slidably disposed in said second set of bores;

wherein said key includes an elongate blade defining in cross section: an upper planar blade portion extending inwardly from one longitudinal edge of the blade, and a lower planar blade portion extending inwardly from another, opposite longitudinal edge of the blade and adjoining an innermost edge of the upper blade portion in a intermediate *ledge* portion of the blade, wherein the plane of the upper blade portion is oriented at a predetermined angle, in a range of 5° to 85° relative to the plane of the lower blade portion to define a general chevron shape therewith; and further wherein said key slot is similarly shaped in cross section so as to receive said blade.

9. The cylinder lock according to claim 8, wherein said intermediate *ledge* portion of said blade includes a horizontal ledge, said horizontal ledge having a bitting surface disposed directly under and along said horizontal ledge of said blade;

said lock cylinder further comprising an additional set of bores disposed directly under a portion of said key slot opposite to said horizontal ledge, said additional set of bores being filled with carbide pins.

10. The cylinder lock according to claim 8, wherein said lock cylinder includes a key removable core subassembly, said core subassembly having a figure-8 shaped cross section and being fitted into a like-shaped opening in said lock cylinder, said cylindrical bore for rotatably mounting said key barrel being formed within said core subassembly.

11. The cylinder lock according to claim 8, wherein said intermediate *ledge* portion of said blade includes a horizontal ledge, said horizontal ledge meeting an outer surface of said upper planar portion at a corner portion, said corner portion having a further bitting surface formed thereon; said lock cylinder further comprising a further set of bores disposed along a portion of said key slot opposite to said corner portion of said blade, said further set of bores being filled with further set of tumbler pins for engaging said further bitting surface of said blade.

12. The cylinder lock according to claim 8, wherein said predetermined angle is in a range of 15° to 45°.

13. The cylinder lock according to claim 8, wherein said key blade having said general chevron shape defines nine profile surfaces to attendantly provide for additional key blank differing.

14. A cylinder lock comprising:

a lock cylinder having a cylindrical bore formed therein;

a key barrel rotatably mounted within said cylindrical bore;

a first set of bores formed in said key barrel on a radial plane;

a plurality of pins slidably disposed in said first set of bores;

a key slot extending longitudinally in said key barrel for receiving a key and intersecting said first set of bores;

a second set of bores formed in said lock cylinder; and a plurality of tumbler pins slidably disposed in said second set of bores;

wherein said key includes an elongate blade defining in cross section: an upper planar blade portion extending inwardly from one longitudinal edge of the blade, and a lower planar blade portion extending inwardly from another opposite longitudinal edge of the blade and adjoining an innermost edge of the upper blade portion in an intermediate portion of the blade, wherein the plane of the upper blade portion is oriented at a predetermined angle relative to the plane of the lower blade portion to define a general chevron shape therewith; and further wherein said key slot is similarly shaped in cross section so as to receive said blade, wherein said intermediate portion of said blade includes a horizontal ledge, said horizontal ledge having a groove disposed directly under and extending longitudinally along said horizontal ledge of said blade;

said lock cylinder further comprising an additional set of bores disposed directly under a portion of said key slot opposite to said horizontal ledge, a corresponding one of said additional set of bores being filled with a carbide warding pin for registering with said groove, and further wherein said groove extends from a tip of said blade to such a length so as to allow said key to fully enter said key slot.

*15. A key for a cylinder lock, the key having a bow portion to be grasped by the fingers and a key blade for entering a complementary shaped key slot, the key blade being functionally longitudinally divided horizontally with a planar upper portion bitted on its upper surface to position tumblers in the same plane as the planar upper portion, and a lower portion extending at an angle of between 5° and 85° relative to the plane of the upper portion, the upper and lower portions being joined at an intermediate horizontal ledge portion which includes at least one flat surface for presenting additional new key differing possibilities and preventing the key from entering a key slot other than those having a complementary angled shape.*

*16. A cylinder lock and key combination comprising:*

*a lock cylinder having a cylindrical bore formed thereon,*

*a key barrel rotatably mounted in the cylindrical bore,*

*a set of tumbler pin holes formed in the key barrel on a radial plane,*

*a plurality of tumbler pins slidably disposed in the set of bores,*

*a key slot extending longitudinally of the key barrel for receiving a key and intersecting with the bores, the key slot being configured with an upper slot portion and a lower slot portion, the lower slot portion being oriented at a predetermined angle in the range of 5° to 85° relative to the plane of the upper slot portion,*

*and a key having a key blade with an upper planar portion and a lower planar portion, the angle between the two planar portions of the key blade being the same as the angle between the two portions of the key slot so that the blade fits into the slot, wherein the upper and lower planar portions are joined by an intermediate horizontal ledge portion, and the upper edge of the upper blade portion is bitted to properly position the tumbler pins in the tumbler pin holes to operate the cylinder lock.*

* * * * *